(12) United States Patent
Gretz

(10) Patent No.: US 11,448,340 B1
(45) Date of Patent: Sep. 20, 2022

(54) FLANGED CONDUIT SUPPORT WITH GANGING MECHANISM

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 207 days.

(21) Appl. No.: 17/034,023

(22) Filed: Sep. 28, 2020

Related U.S. Application Data

(63) Continuation-in-part of application No. 16/846,571, filed on Apr. 13, 2020.

(60) Provisional application No. 62/910,744, filed on Oct. 4, 2019.

(51) Int. Cl.
*F16L 1/00* (2006.01)
*F16L 1/09* (2006.01)
*E04G 15/06* (2006.01)
*F16L 5/00* (2006.01)

(52) U.S. Cl.
CPC ............... *F16L 1/09* (2013.01); *E04G 15/06* (2013.01); *F16L 5/00* (2013.01)

(58) Field of Classification Search
None
See application file for complete search history.

(56) References Cited

U.S. PATENT DOCUMENTS

| 390,003 | A | * | 9/1888 | Thimble | ................... F16L 5/00 |
| | | | | | 126/317 |
| 1,010,659 | A | * | 12/1911 | McCabe et al. | .......... F16L 5/00 |
| | | | | | 126/317 |
| 2,549,192 | A | * | 4/1951 | Gresham | ................... F16L 3/00 |
| | | | | | 126/318 |
| 2,813,692 | A | * | 11/1957 | Peterson | .............. H01B 17/306 |
| | | | | | 277/606 |
| 4,626,620 | A | * | 12/1986 | Pyler | .................... H02G 3/083 |
| | | | | | 285/151.1 |
| 4,656,689 | A | * | 4/1987 | Dennis | .................... F16L 5/027 |
| | | | | | 16/2.2 |
| 5,896,892 | A | | 4/1999 | Adamson et al. | |
| 6,725,611 | B2 | | 4/2004 | DeFiglio | |
| D534,060 | S | | 12/2006 | Kiely | |
| 7,705,240 | B2 | * | 4/2010 | Armstrong | ............. H02G 3/088 |
| | | | | | 174/77 R |
| 7,709,755 | B2 | * | 5/2010 | Pfister | ................. B60R 16/0222 |
| | | | | | 174/152 G |

(Continued)

*Primary Examiner* — Steven M Marsh

(57) ABSTRACT

A flanged conduit support for forming openings in a poured concrete structure. The flanged conduit support includes a flange and a hub with a socket. A ganging means on the flanged conduit support enables the joining and locking of two or more supports together in a spaced relationship. The ganging means includes a male snap member with a tab and a tapered end and the female snap member includes a receiving slot. The flanged conduit support provides a means for rapidly securing a first end of conduit to a form and capping the opposite ends of the conduit to prevent the entry of concrete during the concrete pour. A removable cap may be removed after the concrete cures to provide one or more open pathways for running electrical cables through the horizontal floors or vertical walls.

14 Claims, 10 Drawing Sheets

(56) References Cited

U.S. PATENT DOCUMENTS

| | | | |
|---|---|---|---|
| 8,307,592 B2* | 11/2012 | Chang | F16L 5/14 |
| | | | 52/220.8 |
| 8,398,034 B2 | 3/2013 | Lambert et al. | |
| 9,225,156 B2 | 12/2015 | Boyer | |
| D749,047 S | 2/2016 | Smith | |
| 2005/0109885 A1* | 5/2005 | Welsh | F16L 59/02 |
| | | | 248/56 |
| 2021/0210938 A1* | 7/2021 | Guo | H02G 3/0456 |

* cited by examiner

FLANGED CONDUIT SUPPORT WITH GANGING MECHANISM

This application is a continuation-in-part of U.S. patent application Ser. No. 16/846,571 filed Apr. 10, 2020 which is pending and claims the benefit of Provisional U.S. Patent Application Ser. No. 62/910,744 filed Oct. 4, 2019, which is pending, the contents of which applications are incorporated herein in their entirety by reference.

FIELD OF THE INVENTION

The present invention relates to concrete structures, and more particularly to a flanged conduit support for forming openings in a poured concrete structure.

BACKGROUND OF THE INVENTION

Running low voltage cable between horizontal concrete floors or vertical walls typically requires an elaborate, expensive support system for creating openings in the concrete pour area. Installers typically brace, wire, or otherwise secure conduit sections to rebar or other structure and then pour concrete to form the floor. Unfortunately, this is a time consuming task and, depending on the number of conduits desired at that location, requires individual, time consuming treatment to form the openings.

Accordingly, what is needed is an apparatus and method that provides an economical and easy to use and alternative for forming openings in a concrete poured structure in order to provide one or more openings for routing low voltage cables through the concrete.

BRIEF SUMMARY OF THE INVENTION

The current invention is a flanged conduit support for forming openings in poured concrete areas, such as between horizontal floors or vertical walls. The flanged conduit support includes a support body including a flange. A hub extends from the flange and includes a socket therein. One or more apertures are provided in the flange. A ganging mechanism is provided on the flanged conduit support to enable the joining and locking together of two or more supports in a spaced relationship. The ganging means includes a male snap member and a female snap member. The male snap member includes a tab with a tapered end. The tab includes a top surface with a first stop and a bottom surface with a second stop. The female snap member includes a receiving slot for engaging the tab of the male snap member. The flanged conduit support provides a means for rapidly securing one or more sections of EMT conduit to forms in a concrete pour area. The flanged conduit support includes a removable cap for preventing the entry of concrete into the conduit during the concrete pour. The removable cap may be removed after the pour and curing of the concrete to provide openings or pathways for running electrical cables through the horizontal floors or vertical walls.

OBJECTS AND ADVANTAGES

One object of the invention is to provide a support apparatus for anchoring one or more sections of conduit or pipe to a concrete form in order to create openings through the resultant concrete structure.

Another object of the invention is to provide a conduit support that can be anchored to a form by simply nailing the support to the form.

A further object of the invention is to provide a system for forming pathways for routing electrical cables between horizontal concrete floors or vertical walls.

A further object of the invention is to provide a conduit support that includes a ganging mechanism for ganging with one or more additional conduit supports for forming a plurality of openings in a side-by-side spaced relationship.

A further object of the invention is to provide a conduit support that includes a removable cap for capping one or more ends of a conduit or pipe during a concrete pour.

Another object is to provide a conduit support can be configured as a bushing with the cap removed or as a cap with the flange intact.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
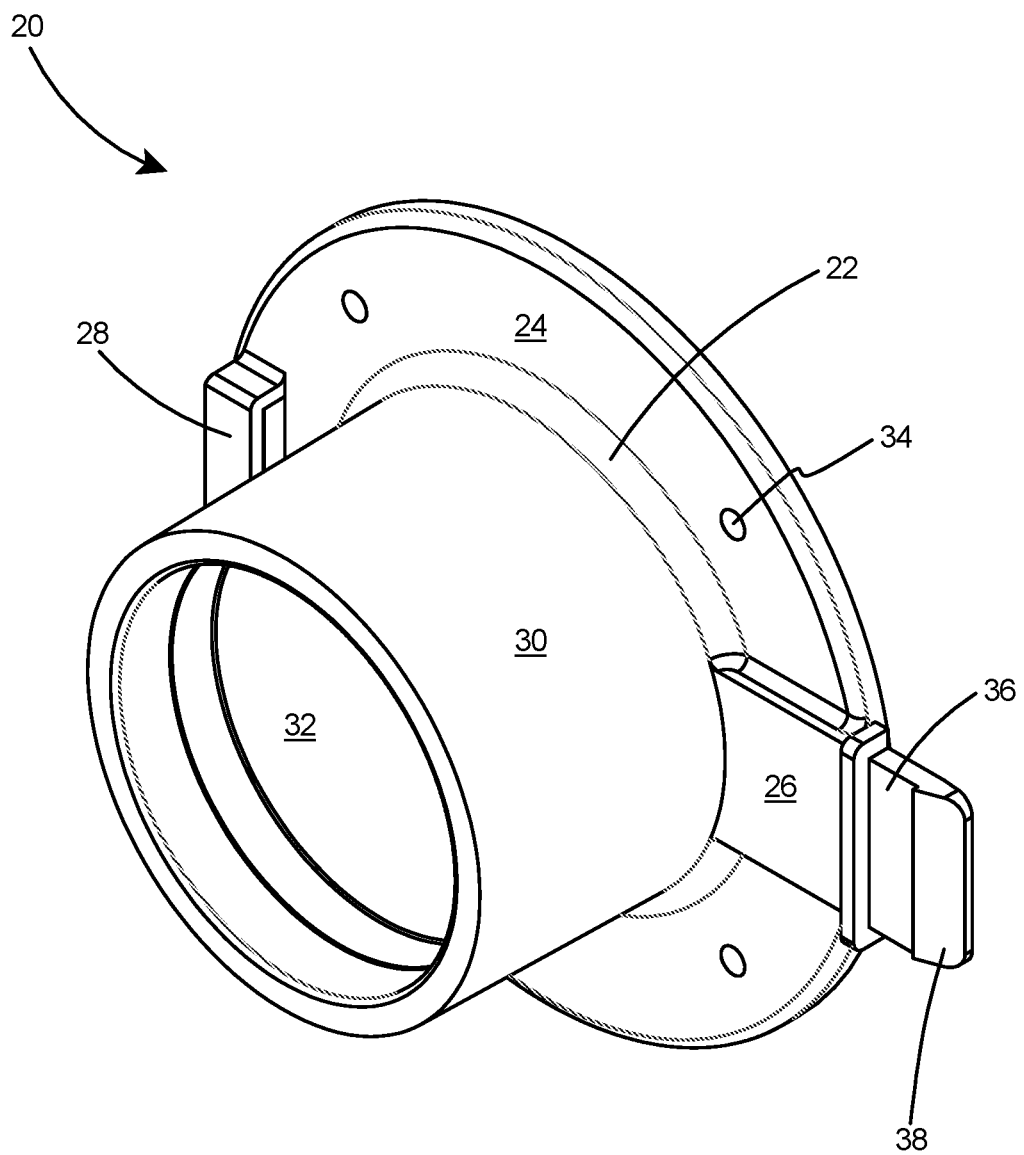
FIG. 1 is a front perspective view of a gangable flanged conduit support for electrical conduit in accordance with embodiments of the invention.

With reference to FIG. 1, the present invention is a gangable flanged conduit support 20 for anchoring electrical metal tubing (EMT) to forms in a concrete pour area in order to create openings in the cured concrete. The flanged conduit support 20 includes a rigid support body 22 having a rigid flange 24, a male snap member 26, and a female snap member 28. A hub 30 extends from the rigid flange 24 and includes a socket 32 therein. One or more apertures 34 are provided in the flange. The meaning of the term 'gangable' is that two or more of the flanged conduit supports can be ganged together in order to form multiple openings through a poured concrete structure. In multi-level construction, a plurality of openings are typically required in order to route the various electrical and communications cables to the various floors.

Figure 2:
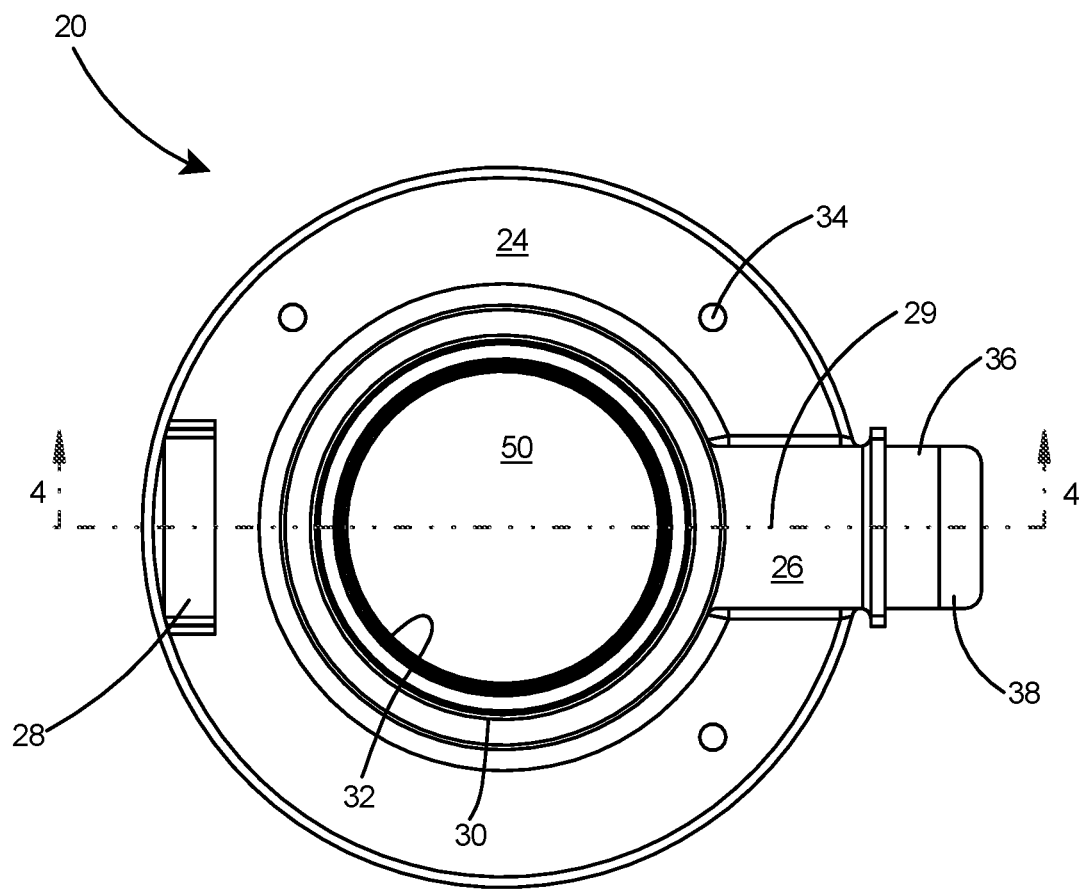
FIG. 2 is a plan view of the flanged conduit support.
Figure 3:
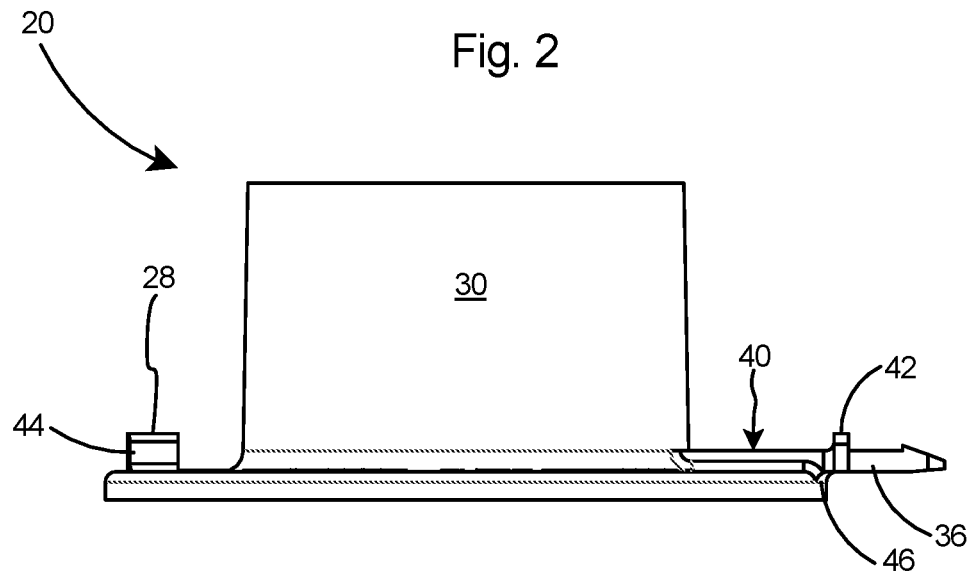
FIG. 3 is a side view of the flanged conduit support.

Referring to FIGS. 2-3, the male snap member 26 of the flanged conduit support 20 includes a tab 36 with a tapered end 38. The tab 36 is substantially planar with the rigid flange 24 and includes a top surface 40 with a first stop 42 extending therefrom. The female snap member 28 extends from the rigid flange 24 on the opposing side of the hub 30 and includes a receiving slot 44. The male and female snap members 26 and 28 are aligned along a common axis 29 through the center of the hub 30 and the male and female snap members are 180 degrees apart with respect to the hub.

Figure 4:
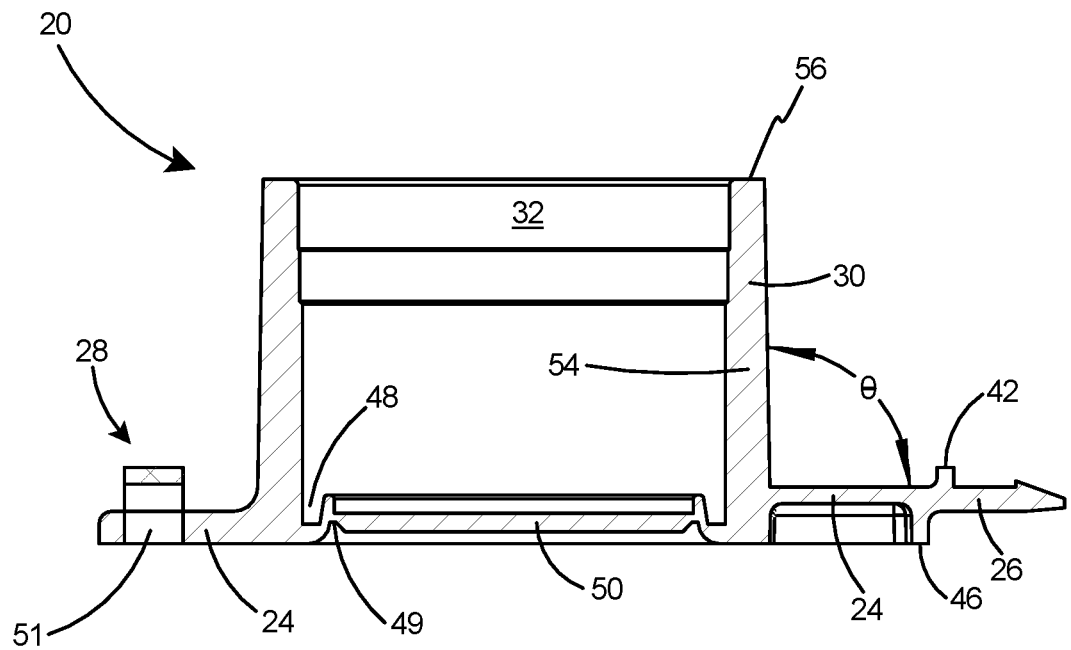
FIG. 4 is a sectional view of the flanged conduit support taken along line 4-4 of FIG. 2.

As shown in FIG. 4, the male snap member 26 further includes a second stop 46 that extends from the lower surface of the tab 36 on the male snap member 26. A conduit seat 48 is provided in the rigid flange 24 within the socket 32 and around the inner periphery of the hub 30. An outer groove 49 is provided on the outer side of the rigid flange 24 thereby creating a removable cap 50 that may be removed by scoring along groove 49 with a utility knife or similar tool. The groove 49 the outer side of the flange 24 is of lesser diameter than the diameter of the conduit seat 48 on the opposing side of the flange 24 and within the socket 32. The flanged conduit support can be configured as a bushing with the flange removed or as a cap with the flange intact. The gangable conduit supports 20 enable creation of a plurality of side-by-side capped conduits, such as in a concrete slab that may form a level in a parking garage. It is a critical feature of the invention that the caps 50 must be removed by scoring with a utility knife or similar tool. A cap that may be broken by a hammer or similar tool would not be acceptable as vehicles traveling across the level in the parking garage could force open a cap prior to intentional removal of the cap to accommodate cables.

Figure 5:
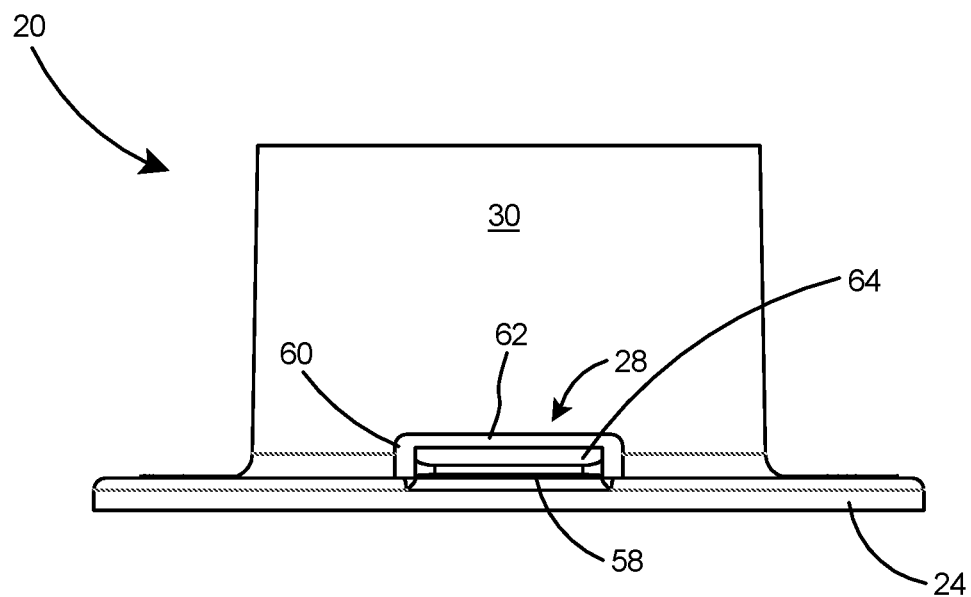
FIG. 5 is a side view of the flanged conduit support.
Figure 6:
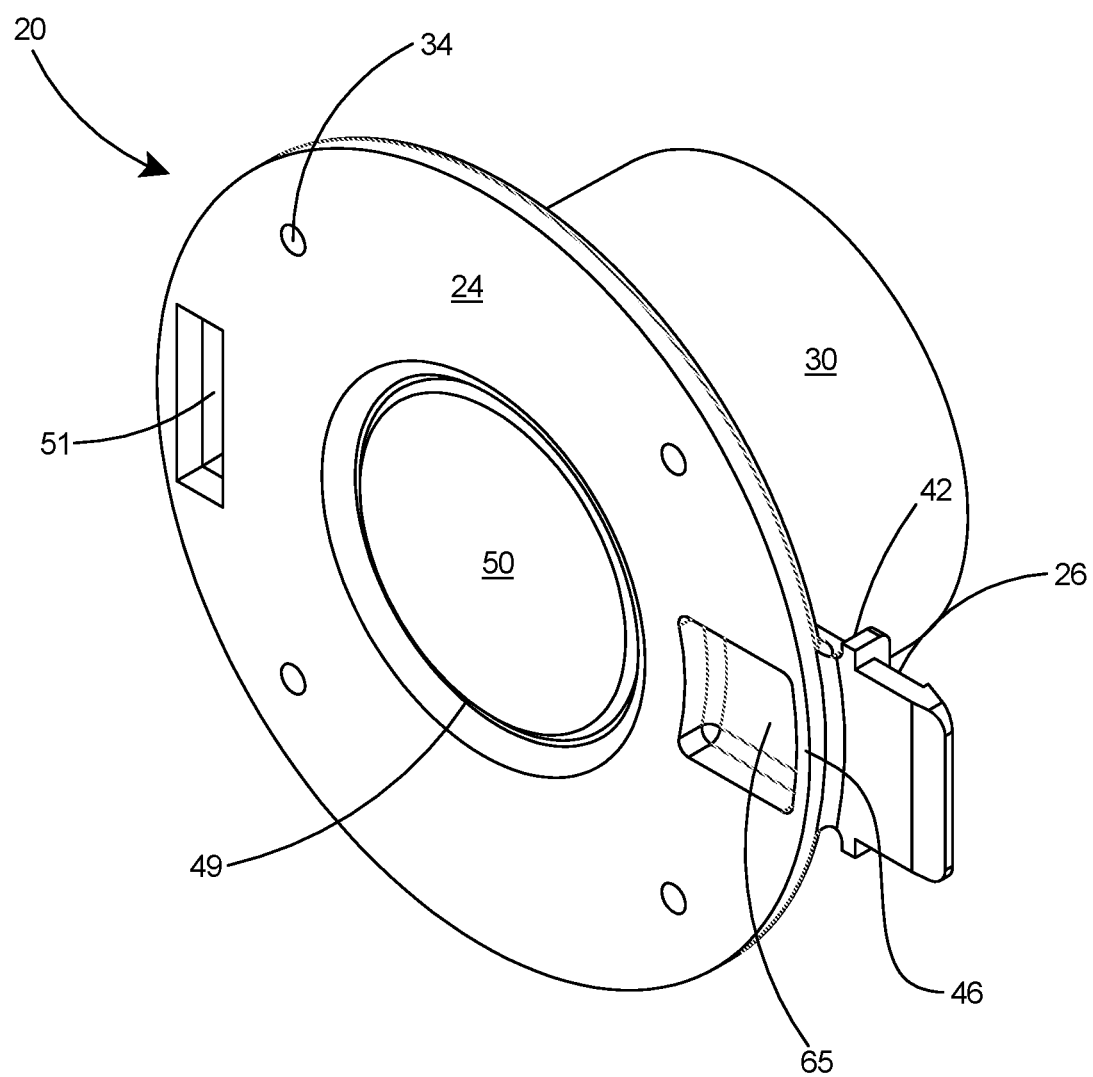
FIG. 6 is a rear perspective of the flanged conduit support of FIG. 1.
Figure 10:
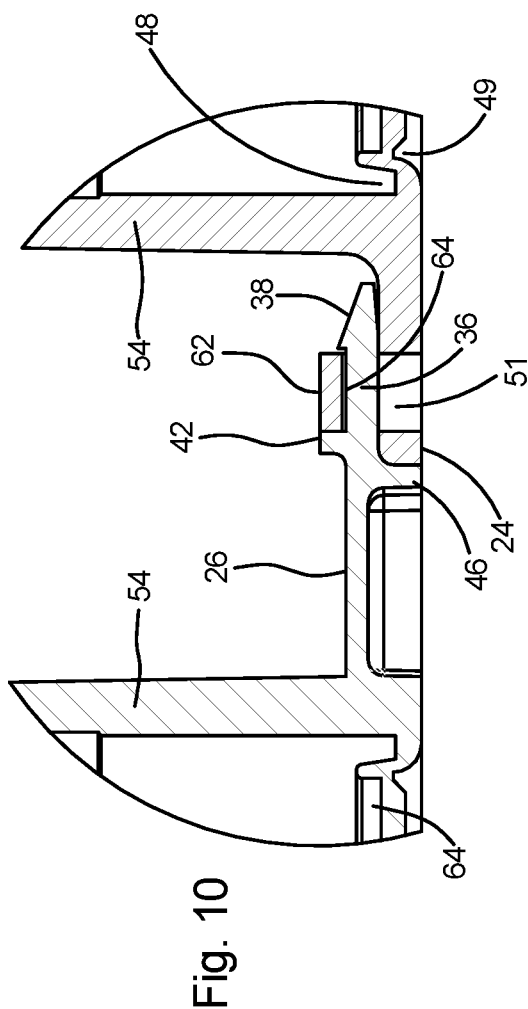
FIG. 10 is a detail view of the joined portions of the ganged conduit supports.
Figure 11:
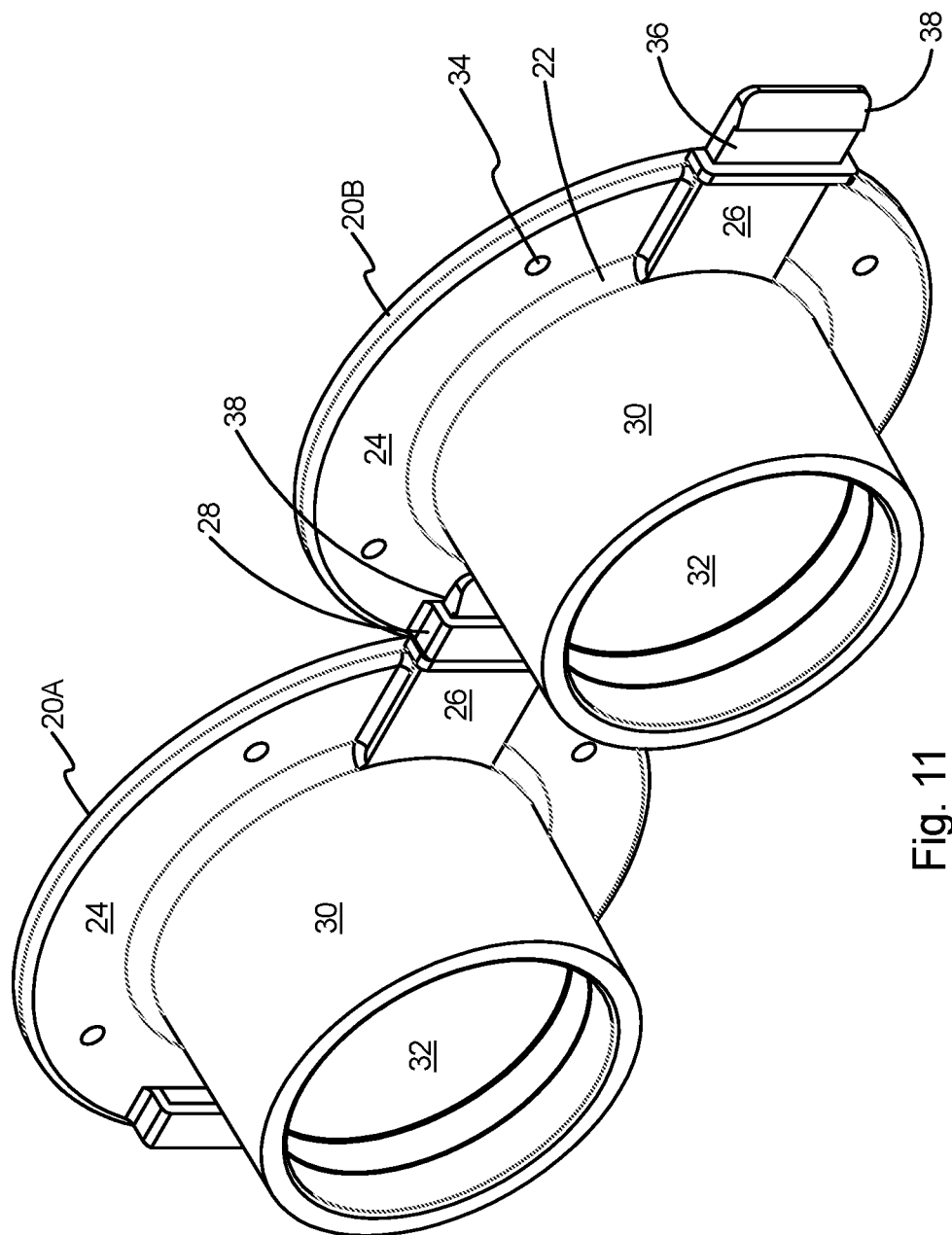
FIG. 11 is a perspective view of the ganged conduit supports of FIG. 7.

An opening 51 on the outer side of the rigid flange 24 opposite the female snap member 28 provides a means for visually verifying full engagement of the male snap member 26 when two conduit supports are snapped together (see FIG. 10). The walls 54 defining the socket 32 are tapered inward from the outer rim 56 of the socket to the rigid flange 24, thus providing the socket 32 a wider inner diameter at the rim 56 and a narrower diameter to the socket 32 at the rigid flange 24 or its innermost extent. As shown in FIG. 5, the female snap member 28 includes a base 58, two sidewalls 60 extending from the base 58, and a top wall 62 defining a receiving slot 64 therein. The opening 51 in the flange is in communication with the receiving slot 64 of the female snap member 28. As shown in FIG. 6, a recess 65 is provided in the bottom surface of the flange 24 adjacent the second stop 46.

The meaning of the term "rigid flange" as used herein is that the flanges 24 are rigid or stiff and are not flexible. The rigid flanges 24 are preferably orthogonal to the hubs 30, or at 90 degrees as shown by angle θ in FIG. 4, and thus the flanged supports 20 are best suited to spanning between two forms that are parallel to one another. The hub 30 and flanges 24 form a rigid structure in which the flange 24 is fixed at an angle of 90 degrees with respect to the hub and maintains the 90-degree relationship throughout the concrete pour.

Figure 7:
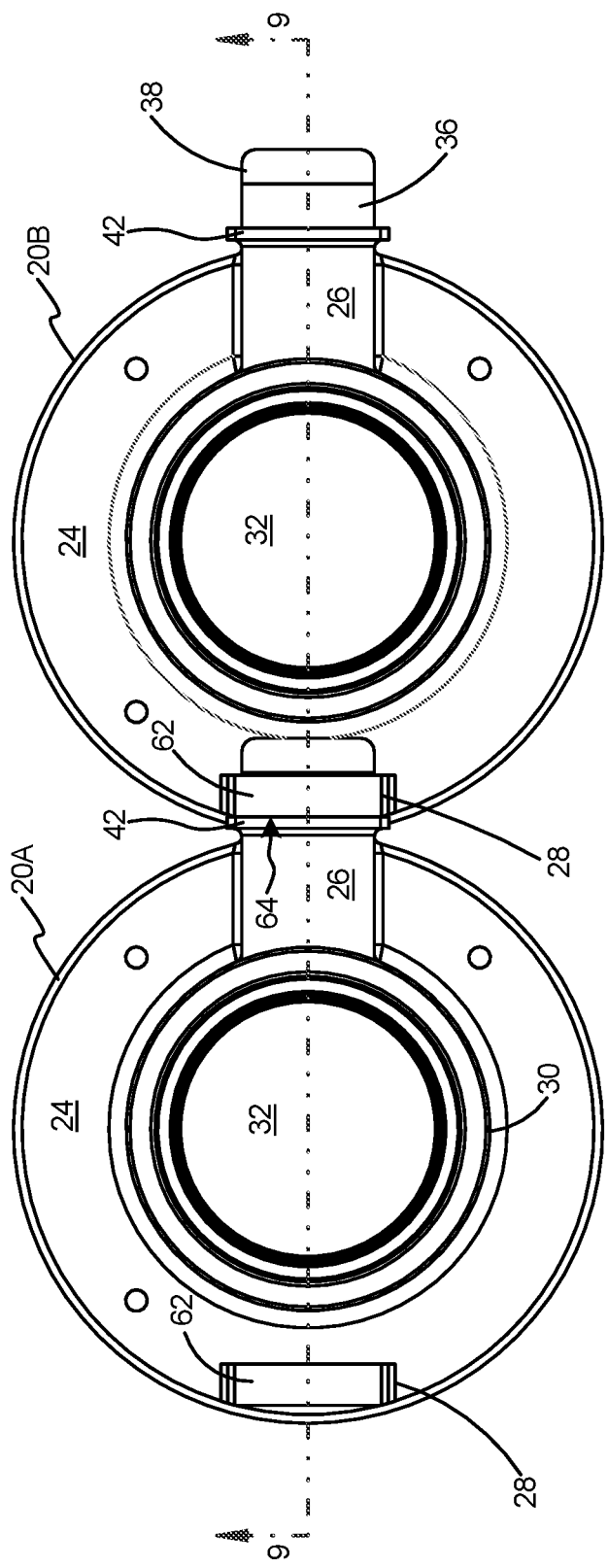
FIG. 7 is a plan view of two conduit supports ganged together in accordance with embodiments of the invention.
Figure 8:
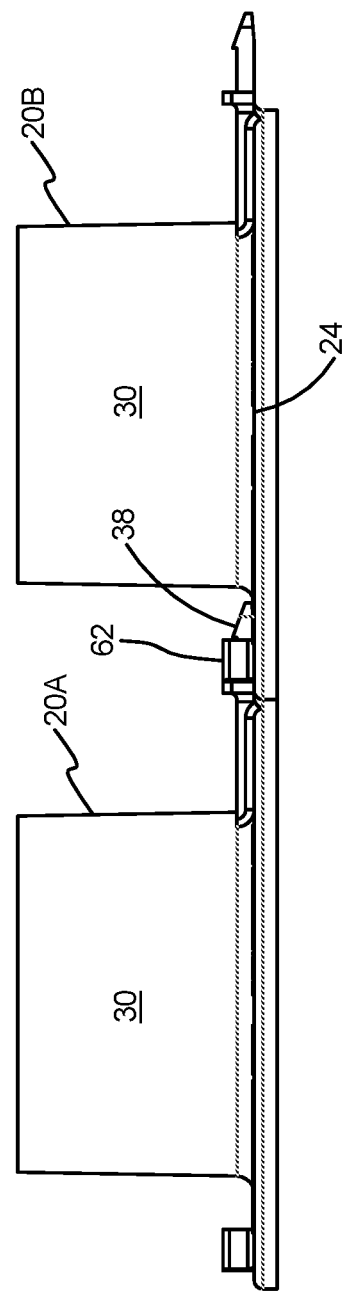
FIG. 8 is a side view of the ganged conduit supports of FIG. 7.

With reference to FIGS. 7-8, one or more conduit supports 20A, 20B may be ganged together by inserting the male snap member 26 within the female snap member 28 of the adjacent conduit support. To gang the conduit supports together as illustrated in FIG. 7, tapered end 38 of tab 36 of male snap member 26 is slid within the receiving slot 64 of the female snap member 28.

Figure 9:
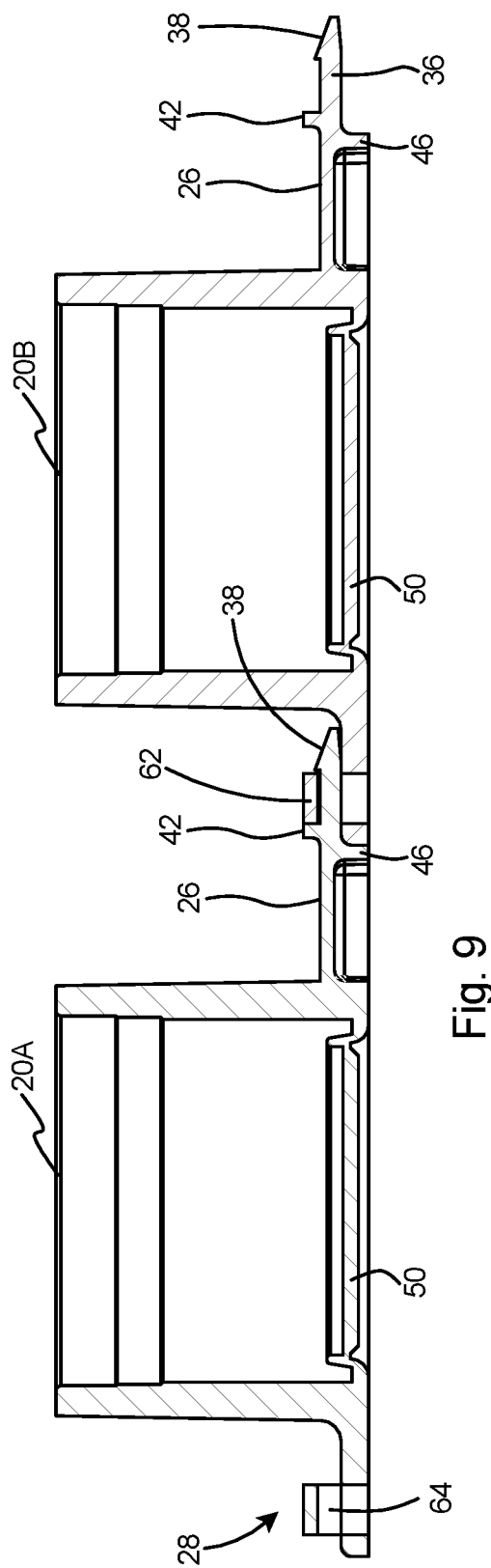
FIG. 9 is a sectional view of the ganged conduit supports taken along line 9-9 of FIG. 7.

Referring to FIGS. 9-10, in order to gang the conduit supports, the tapered end 38 of tab 36 of the first conduit 20A is slid within the receiving slot 64 of the female snap member 28 until first stop 42 of the male snap member 26 engages the top wall 62 of the female snap member 28 and second stop 46 of the male snap member 26 engages the rigid flange 24 of the second conduit 20B.

Figure 12:
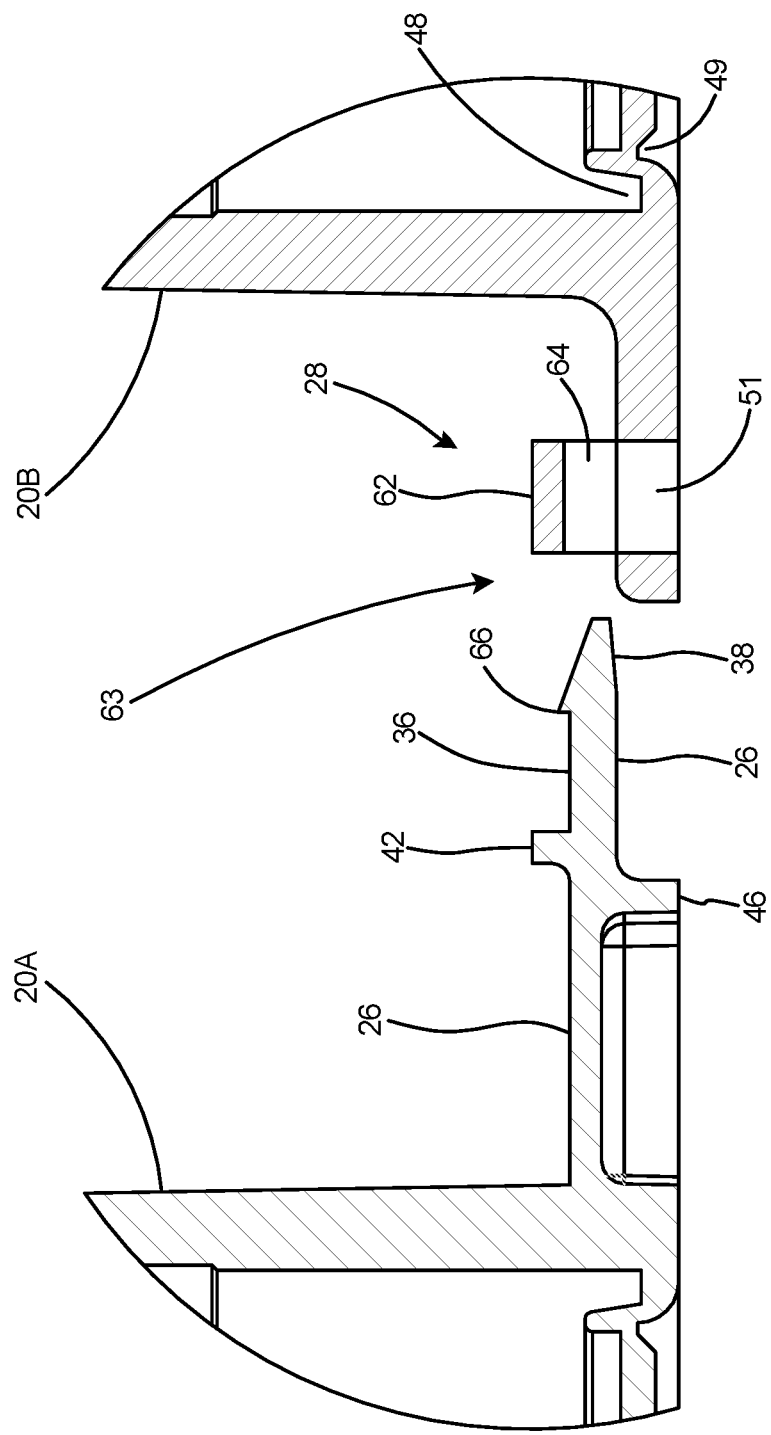
FIG. 12 is a detail view of two adjacent portions of the ganged conduit supports in alignment to be snap fitted together.

With reference to FIG. 12, tapered end 38 of male snap member 26 includes a barb 66 that is wider than the tab 36 portion of the male snap member 26 and wider than the receiving slot 64 of the female snap member 28. The male snap member 26 and top wall of the female snap member form a ganging means 63 for joining and locking two or more conduit supports together. As the male snap member 26 is pressed through the receiving slot 64, a distinct snap engagement occurs as barb 66 clears the top wall 62 of the female snap member 28, thereby locking the two conduits 20A and 20B securely together.

Figure 13:
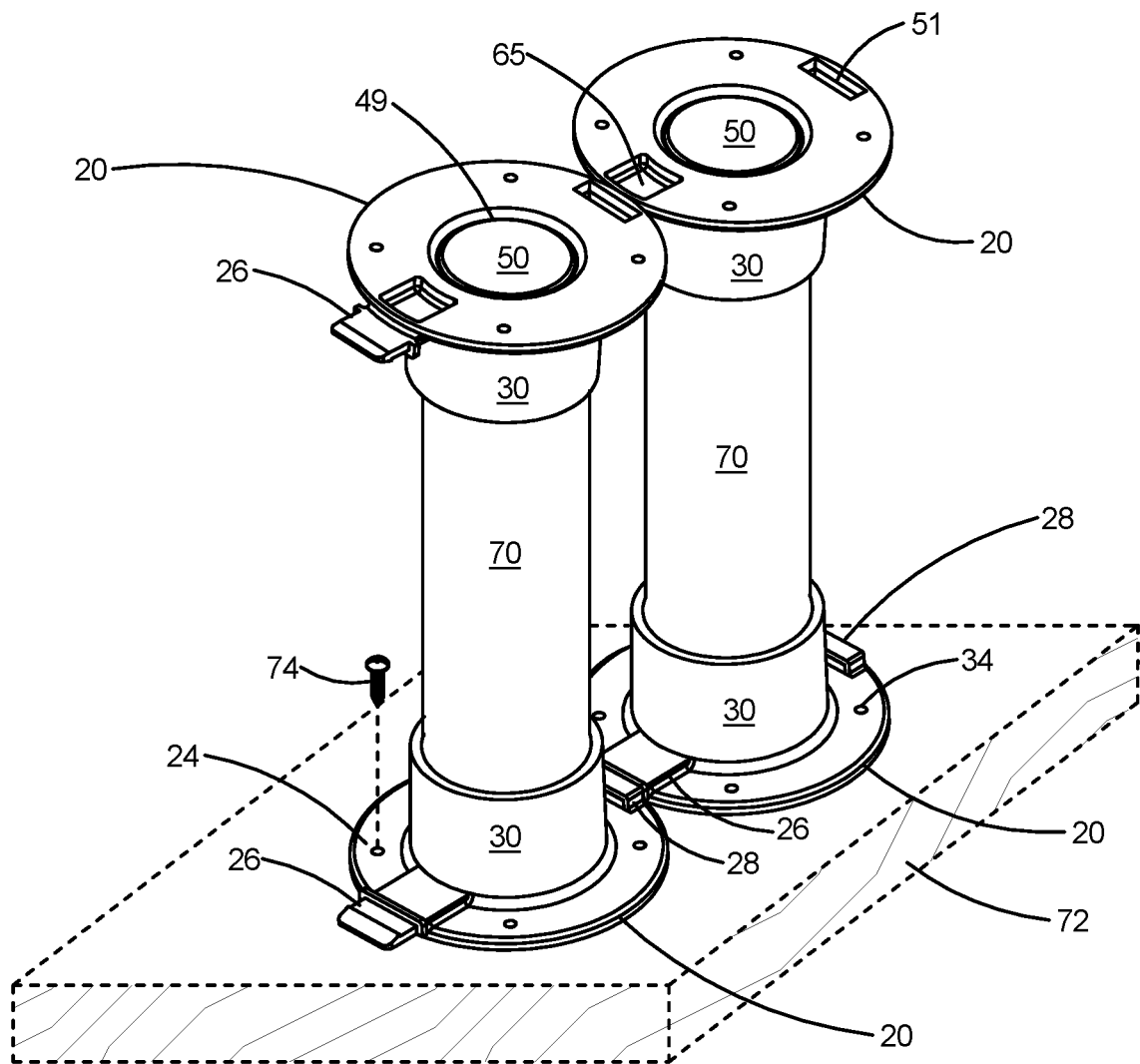
FIG. 13 is an isometric view of a plurality of flanged supports ganged together to support two conduit sections according to the invention.

Referring to FIG. 13, a plurality of flanged supports 20 are ganged together and support two sections of EMT conduit 70 that will form a pathway through a concrete pour area. One or more flanged supports 20 are snapped together and secured, with the hubs 30 facing up, to a form 72 or similar multilevel building structure into which concrete will be poured to create the floor. The rigid flanges 24 of the lower flanged supports are simply nailed to the form. Conduit is then inserted the conduit into the lower flange supports 20 with the ends of the conduit captured by the conduit seats 48 (see FIG. 4) in each hub 30. A corresponding number of flanged supports 20 are then snapped together and fitted, with the hubs 30 facing down, on the top ends of each conduit. The removable caps 50 on the upper flanged supports 20 are left intact to prevent concrete from entering the conduit sections 70 during the concrete pour Concrete (not shown) is then poured into the form and fills the volume extending from the top surface of the form 72 to the level of the flanges 24 of the upper flanged supports. After the concrete is cured and the form is removed, one or more of the removable caps 50 may be left intact for future installation of wiring or may be removed in order to pass electrical cables through one or more of the conduits 70.

Add additional conduit by joining the necessary bushings together using the built-in ganging means. Cap the opposite ends of conduit with another set of bushings to seal off. After the concrete sets, remove the center of the cap to use as a bushing for low voltage cable. The flanged conduit supports will work with EMT, rigid IMC, or PVC rigid conduit. The flanged conduit supports are an easy to use, economical alternative for multiple conduit support.

Figure 14:
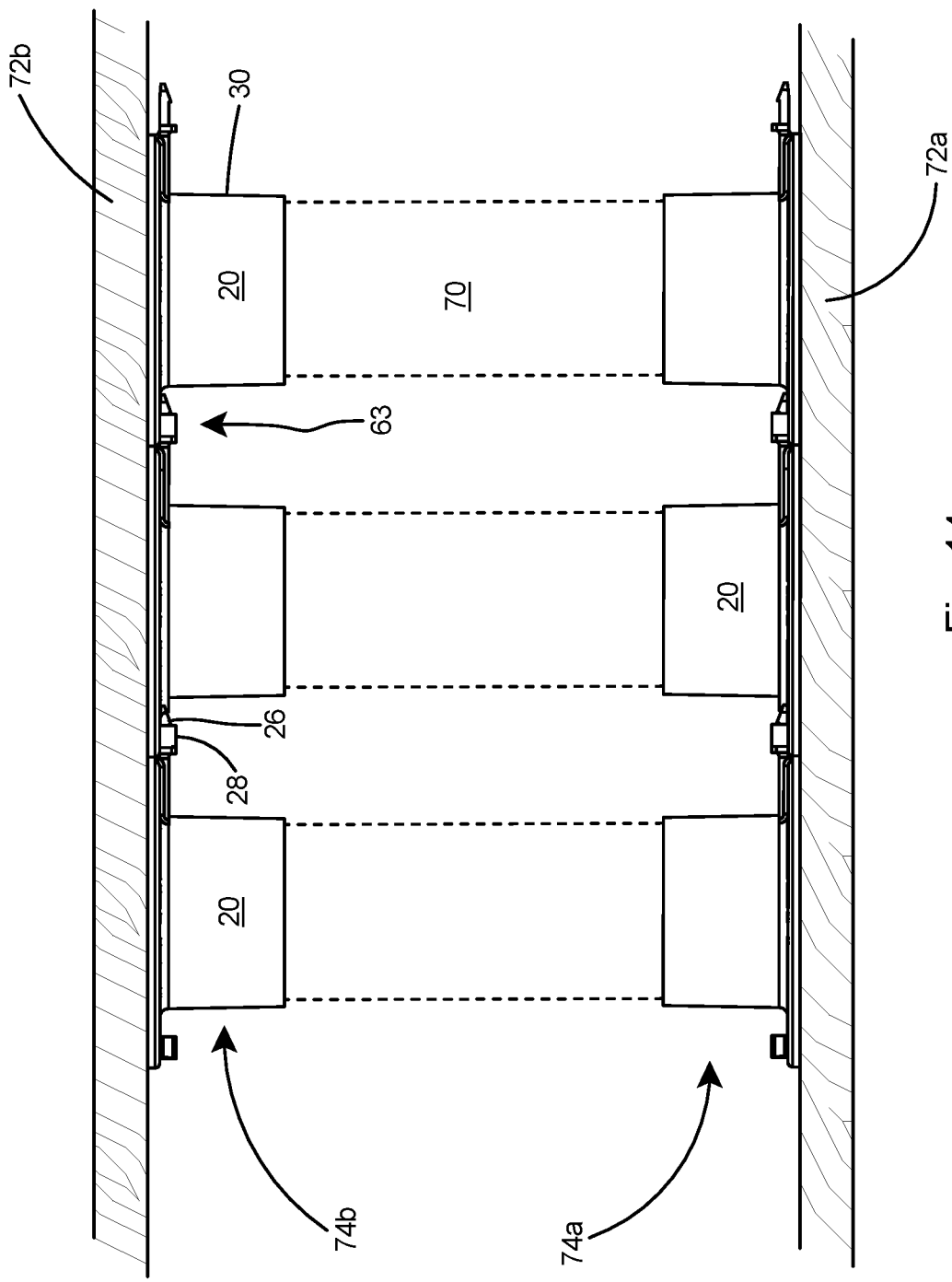
FIG. 14 is a side view of three pairs of flanged conduit supports extending between two wooden horizontal forms for forming openings within a concrete floor in accordance with principles of the invention.

With reference to the example shown in FIG. 14, there are shown three pairs of flanged conduit supports 20 secured to opposing wooden horizontal forms 72a and 72b for forming openings within a concrete floor in accordance with principles of the invention. In this example, a first set 74a of conduit supports 20 are ganged together using the ganging means 63 and are secured to a first of the forms 72a. A conduit section 70 is fitted into the hubs 30 of the first set of ganged conduit supports. A second set 74b of conduit supports 20 are then ganged together and secured to the second form 72b with each of the opposing pairs of flanged conduit supports in axial alignment with a corresponding conduit support.

The gangable flanged conduit supports according to the invention are preferably molded in one-piece of plastic. Most preferably the plastic is polyethylene.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A conduit support for forming a pathway through a concrete pour area, comprising:
    a support body including a rigid flange;
    a hub on said flange;
    a male snap member and a female snap member extending from the support body; and
    a removable cap on said flange.
2. The conduit support of claim 1, comprising an outer groove defining said removable cap.
3. The conduit support of claim 2, comprising:
    a socket on said hub; and
    said socket including a conduit seat.
4. The conduit support of claim 1, wherein said male snap member comprises:
    a tab; and
    a tapered end.
5. The conduit support of claim 4, wherein said female snap member includes a receiving slot therein.
6. The conduit support of claim 5, comprising a barb on said tab of said male snap member.
7. The conduit support of claim 6, comprising:
    a first stop on said male snap member; and
    a second stop on said male snap member.
8. The conduit support of claim 1, wherein said female snap member comprises:
    a base;
    a top wall; and
    a side wall.
9. The conduit support of claim 1, comprising:
    said male and female snap members aligned along a common axis through the hub; and
    said male and female snap members are 180 degrees apart on said common axis.
10. The conduit support of claim 1, comprising one or more apertures in said flange.
11. The conduit support of claim 3, wherein said socket comprises:
    walls and an outer rim; and
    said walls are tapered inward from the outer rim of the socket to the flange.
12. A conduit support for forming a pathway through a concrete pour area, comprising:
    a support body including a rigid flange having a first side and a second side;
    a hub extending from the first side of said flange;
    a socket in said hub;
    a male snap member and a female snap member extending from the support body; and
    a removable cap in said flange.
13. The conduit support of claim 12, comprising:
    said hub is centered on said first side of said flange; and
    said removable cap is centered on said flange.
14. The conduit support of claim 12, comprising an outer groove defining said removable cap.

* * * * *